United States Patent [19]

Beaudoin et al.

[11] 3,971,263
[45] July 27, 1976

[54] VARIABLE DIAMETER PULLEY WITH MEANS FOR CHANGING WEAR PATTERN ON THE PUSHER RING

[76] Inventors: Guy Beaudoin, 1238 Chabanel Street, Drummondville South, Quebec; Marcel Vincent, 320 Herbert Street, Wickham, Quebec, both of Canada

[22] Filed: Jan. 14, 1975

[21] Appl. No.: 541,070

[52] U.S. Cl. .......................................... 74/230.17 E
[51] Int. Cl.² .......................................... F16H 55/52
[58] Field of Search ............ 74/230.17 E, 230.17 R, 74/230.17 A, 230.17 B, 230.17 M, 217 CV, 336

[56] References Cited
UNITED STATES PATENTS
3,597,987   8/1971   Kiekhaefer .................. 74/230.17 E

*Primary Examiner*—Samuel Scott
*Assistant Examiner*—A. Russell Burke

[57] ABSTRACT

A variable diameter pulley with centrifugal responsive weight means. Said pulley having means to adjust the wear pattern on the pusher ring thru an angular shiftable carrier block due to the inertial shifting between said carrier block and the input drive plate which frictionally engages said carrier block. Said pulley also having manually selectable negative torque responsive means, which in operation oppose the centrifugal responsive means.

4 Claims, 4 Drawing Figures

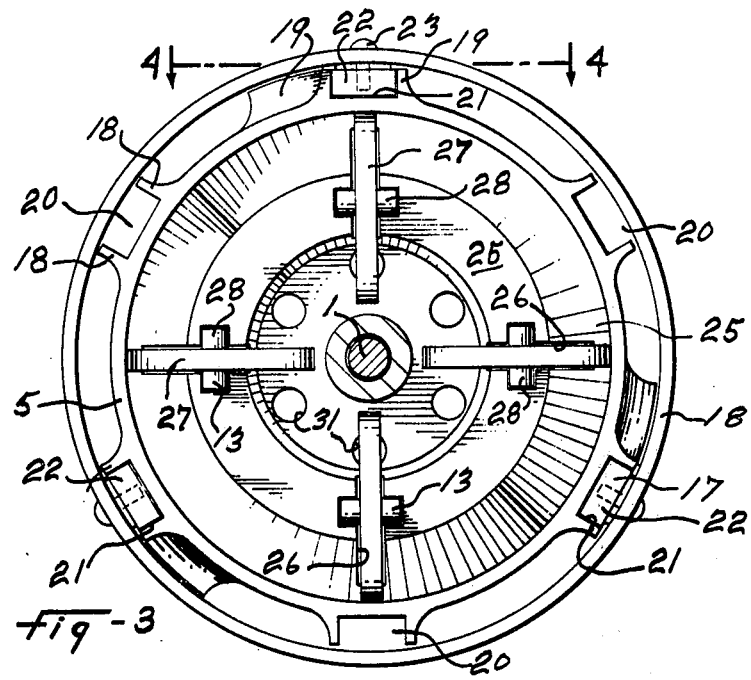
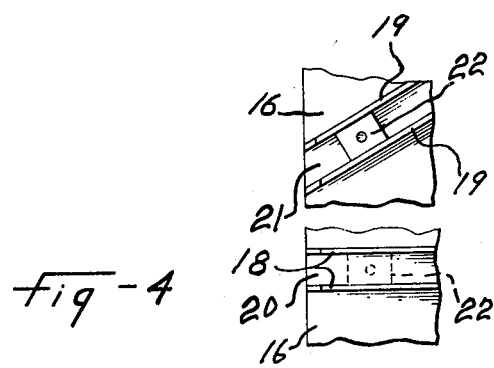

VARIABLE DIAMETER PULLEY WITH MEANS FOR CHANGING WEAR PATTERN ON THE PUSHER RING

This invention relates to a pulley of the type having a pair of pulley flanges adapted to be axially moved toward and away one from the other to vary the effective engagement of a belt therewith. A pulley of this type finds particular application in a snowmobile.

The anteriorly proposed pulleys of the above type reveal that other desiderata concerning the operation of such pulleys have not been met and that further functional and structural advantages may be imparted to such pulleys. In particular, the heretofore proposed pulleys of the above type which use centrifugally actuating weights or levers involve radial frictional displacement of the latter against an appropriate abutment face which bodily rotates with the weights and, consequently, the latter always contact that face at the same points and there results substantial wear localized at those points.

It is a general object of the present invention to provide a variable diameter pulley of the above type, which is adapted to reduce the wear therein and the maintenance resulting from such wear, and, more particularly, to reduce the wear produced by the frictional displacement of centrifugal weights or levers against the associated abutment face.

It is a more specific object of the present invention to provide in a variable diameter pulley of the above type which includes centrifugally movable weights or levers, a carrier member or body for the latter which is angularly shiftable relative to the face against which the weights radially and frictionally move such as to angularly vary the points of engagement of the weights with this face and thus spread the wear over the circumference of the contacted face.

The above and other objects and advantages of the present invention will be better understood by the following description of a preferred embodiment thereof, which is illustrated, by way of example, in the accompanying drawings, wherein:

FIG. 3 is a cross-sectional view as seen along line 3—3 in FIG. 1; and

FIG. 4 is a developed plan view of peripheral portions of the centrifugal weight carrier forming part of the pulley of the preceding figures.

Figure 1:
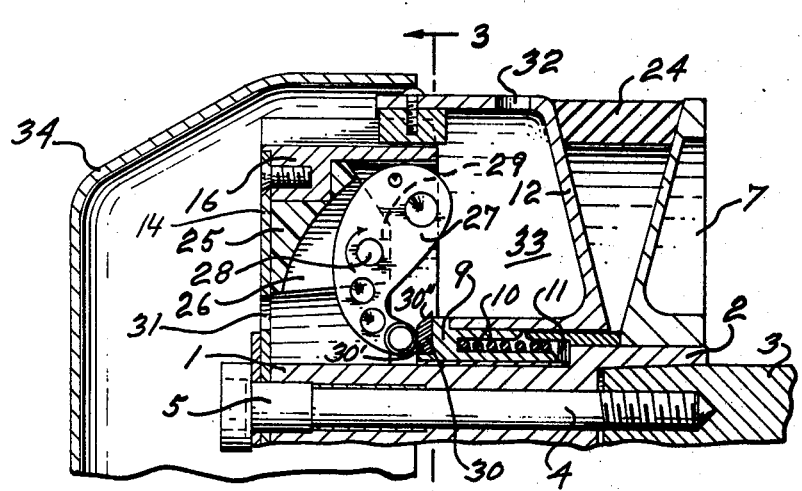
FIG. 1 is an axial cross-sectional view through a variable diameter pulley having an axially displaceable flange shown under full centrifugal weight action thereon according to the present invention.

The illustrated variable diameter pulley includes a shaft 1 having an axially bored end 2 engaging on the end of a driving shaft 3. The pulley shaft 1 is fixed to the driving shaft 3 by a bolt 4 extending through a bushing 5. The axially bored end 2 is of larger diameter than the remainder of the pulley shaft and forms an annular shoulder 6 constituting an axial abutment or stop, the function of which will be better defined later.

A pulley flange 7 is rigidly fixed on the bored end 2 for rotation with the pulley shaft 1 and in axially fixed position relative to the latter. A sleeve 8 is also rigidly fixed on the bored end 2 and projects axially away from the pulley flange 7. Another sleeve 9 is rotatably and slidably mounted on the pulley shaft 1. The sleeves 8 and 9 cooperatively form an annular space with each other in which is contained a compression spring 10. Shims 11 are positioned against the annular shoulder or stop 6 with the spring 10 in abutment therewith. As seen in FIG. 1, the shims 11, in cooperation with the axial stop 6, limit the axial displacement of the sleeve 9 toward the fixed pulley flange 7, such as to provide a minimum clearance between the axially displaceable pulley flange 12 and the fixed flange 7. The pulley flange 12 is fixed to the sleeve 9 for bodily axial and rotational displacement therewith. The axially displaceable flange 12 is formed with a cylindrical skirt portion 13 at the periphery thereof.

A circular drive plate 14 is clamped against the end of the pulley shaft 1 by the bolt 4 and the washer 15. A sleeve 16 is secured peripherally to the drive plate 14 by screws 17, or other suitable expedient, and projects from the drive plate toward the pulley flanges 7 and 12. Thus, the cylindrical skirt portion 13 circumscribes the sleeve 16 in radially spaced-apart relationship. The sleeve 16 is formed with ridges 18 and 19 against the external cylindrical surface thereof. These ridges 18 and 19 project longitudinally of the axis of the pulley. In particular, the ridges 18 extend parallel to the axis of the pulley and thus form similarly projecting grooves or guideways 20. The ridges 19, instead, extend at an angle or oblique to the axis of the pulley and form similarly projecting grooves or guideways 21. In other words and as illustrated, the grooves 21 extend at an angle or obliquely and symmetrically relative to the generatrix of the external cylindrical surface and in a predetermined direction relative to the direction of rotation of the centrifugal weight carrier. Thus, the grooves 21 extend at an angle or obliquely and symmetrically relative to the grooves 20. As shown in FIG. 3, the grooves 21 alternate with the grooves 20 around the circumference of the external cylindrical surface. The follower blocks or pads 22 are selectively engaged in either the straight guidways 20 or the oblique grooves 21, but cannot be engaged in both sets simultaneously. When said pads are engaged in the oblique grooves the pulley also becomes negatively torque responsive in addition to being speed responsive. Cooperation with the oblique grooves allows relative angular rotation between the movable flange 12 and the drive plate 14 which results in a recessive axial displacement between the two members and thereby retarding the centrifugally responsive action on the pulley flange so as to reduce the effective diameter more quickly upon high torque loads. It must be noted that the blocks 22 are pivotally mounted against the inner face of the cylindrical skirt 13, by rivets 23, to thereby allow selective engagement in the grooves 20 or 21.

As shown in FIG. 3, there are three follower blocks 22 spaced along the circumference of the cylindrical skirt 13 and engaged in the set of three corresponding grooves 21. It must be noted that the aforementioned selective engagement of the blocks or pads 22 in the grooves 21 is made upon assembly of the pulley such that the blocks would stand in the set of grooves 20 instead of in the set of grooves 21.

The drive plate 14 and sleeve 16 thus drive the pulley flange 12 at the periphery thereof and the required clearances of the blocks 22 in the grooves produce less angular vibration and noise than the conventional splined drive through the hub of the pulley flange, since the same clearances are farther from the rotation axis and thence reduce the possible angular play. Preferably, the blocks or pads 22 are made of nylon, plastic, rubber or the like, which further enhances the reduction of noise.

It must be noted that the afore-mentioned angle of the grooves 21 relative to the generatrix is chosen to produce a predetermined axial component of force by driving action of the grooves 21 against the follower members or pads 22 upon acceleration of the drive plate 14 bodily rotating with the sleeve 16. This axial component of force is of such magnitude and direction to induce a recessive axial action on the blocks 22 and, consequently, on the axially displaceable flange 12 that initially delays the action of the afore-described centrifugal weights and to thereafter produce a more energetic drive of the belt 24.

A carrier member or body 25, made of a block of plastic or the like, is positioned against the circular plate 14 inside the sleeve 16. This carrier member or body 25 is urged by action of the spring 10 in friction drive engagement with the inner face of the circular plate 14, such as to allow some angular shifting of the carrier member or body 25 relative to the circular plate upon acceleration of the latter. The carrier member 25 is formed with four radial slots 26, each having a centrifugally responsive weight or lever 27 pivoted therein by a pin 28 engaged in a corresponding open notch 29. The weights 27 may thus be readily inserted in the notches 29 which are axially extending relative to the axis of the pulley.

A pusher ring 30, of wear-resistant material, is removably engaged on the sleeve 9 for rotation therewith. The pusher ring 30 has opposite sides or faces made with dissimilar radial contours; in this case, a completely straight line contour on one face and a broken line contour on the other face defining inner face 30' and outer bevelled face 30'' respectively. The pusher ring 30 is engaged by the weights 27 whose pivotal movement upon increasing centrifugal action produces axial displacement of the ring and the displaceable flange 12 toward the axially fixed flange 7.

Upon sufficient changes in the acceleration or deacceleration of the pulley, the so called inertial shifting will bring about a relative angular shifting or rather slippage between the carrier member 25 and the drive plate 14 due to the respective inertial mass of each of said members and also because of the frictional cooperation between said members. Thus, the points of contact of the weights 27 with the ring 30 are similarly angularly varied, resulting in more even wear of the pusher ring 30 and longer life of the latter.

Figure 2:
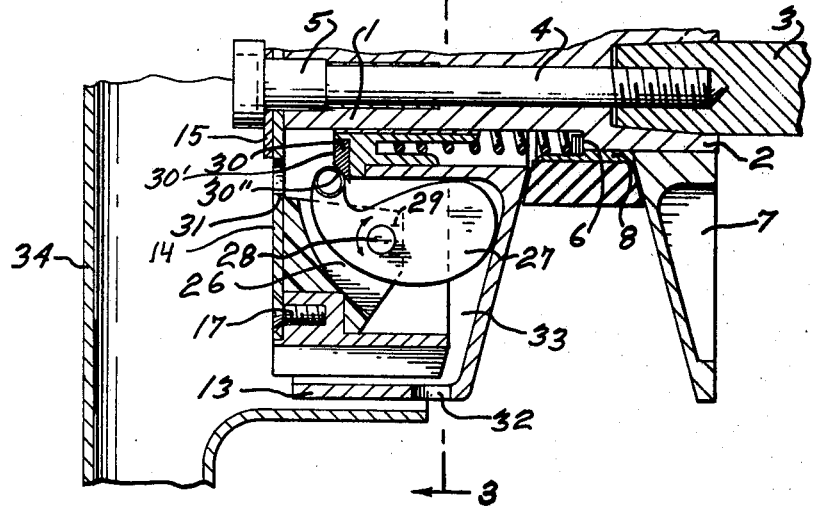
FIG. 2 is a view as in FIG. 1 but with the axially displaceable pulley flange fully de-actuated or in the idle position.

The pusher ring 30 may be reversed to selectively present one of the two radially contoured faces to the weights 27. For normal operation, the completely flat face is presented. When the opposite face is presented, as shown in the drawings, the inner end of weights 27 engage bevelled face 30'' in the rest position of the pulley, as shown in FIG. 2. With increase in pulley speed, the inner end of weights 27 has to move up the bevelled face 30'' to engage the perpendicular face portion 30'; thus, clutching takes place at a higher speed than normally. In the closely spaced apart position of the pulley flanges, as shown in FIG. 1, the inner end of each weight still engages perpendicular face portion 30'. The angle of bevelled face portion 30'' may vary between about ½° and 90° with respect to face portion 30'. The greater the angle, the higher will be the speed at which clutching takes place. The rate of axial response of the displaceable pulley flange 12 may thus be preset according to the need.

The circular plate 14 is provided with air inlet ports or apertures 31, while the skirt 13 of the displaceable flange is provided with air outlet ports or apertures 32 arranged radially outwardly of the inlet ports 31. The centrifugal weight carrier formed of the drive plate 14, the sleeve 16 and the carrier member or body 25 forms an annular space 33 in cooperation with the displaceable flange 12. This arrangement causes the flat weights 27 to act as vanes producing radially outward ventilation by air intake through the inlet ports 31, air flow in the annular space 33 and air exit through the outlet ports 32. This air flow cools the pulley itself and, in a snowmobile, is taken from outside the engine hood by a duct 34 and is circulated inside this hood to cool the engine and other driven parts. This is important, since it permits to close the hood to reduce noise while allowing proper cooling of the engine.

The shims 11 may be removed in relation to the wear of the belt 24, to allow the sleeve 9 and the flange 12 to bodily move closer to the axially fixed pulley flange and thus compensate for the wear of the belt and consequently produce a pulley which retains the same performance characteristics during the life of the belt.

We claim:

1. A variable diameter pulley comprising shaft means defining the axis of rotation of the pulley, a first and a second pulley flanges coaxially mounted on said shaft means, said first pulley flange being axially displaceable along said shaft means and having axially opposite sides with one of the latter facing said second pulley flange, a pusher ring adjoining the other of said sides of said first pulley flange relative to said one side facing said second pulley flange, a drive member secured to said shaft means and bodily rotatable therewith, a centrifugal weight carrier body circumferentially surrounding said shaft means and rotatable relative to the latter and to said drive member about said axis of rotation in friction drive engagement with said drive member, and centrifugal weights movably supported by said carrier body in rotatively shiftable and axial engagement with the pusher ring, whereby acceleration of the drive member produces friction drive of the carrier body and inertial angular shifting of the latter and of the centrifugal weights about said axis relative to the pusher ring.

2. A variable diameter pulley as defined in claim 1, wherein said drive member defines a circular face axially facing said first pulley flange and said pusher ring, and said carrier body is interposed between said first pulley flange and said drive member and makes the friction drive engagement with said circular face.

3. A variable diameter pulley as defined in claim 2, wherein said carrier body has notches extending therein axially away from said first pulley flange, and pivots removably carry the centrifugal weights in said notches.

4. A variable diameter pulley as defined in claim 3, wherein said pusher ring is made of wear-resistant material and said carrier body constitutes an annular block of plastic coaxially mounted on said shaft means.

* * * * *